United States Patent [19]

Kazmierowicz

[11] 4,242,907

[45] Jan. 6, 1981

[54] APPARATUS FOR MONITORING AND CONTROLLING A FLAT ZONE IN A FURNACE

[76] Inventor: Casimir W. Kazmierowicz, 26546 Aracena Dr., Mission Viejo, Calif. 92675

[21] Appl. No.: 11,413

[22] Filed: Feb. 12, 1979

[51] Int. Cl.³ .................................................. G01K 7/06
[52] U.S. Cl. .................................................. 73/341
[58] Field of Search ................................... 73/340, 341

[56] References Cited

U.S. PATENT DOCUMENTS

| | | | |
|---|---|---|---|
| 3,280,312 | 10/1966 | Sandelien | 73/340 X |
| 3,540,280 | 11/1970 | Schoenlaub | 73/341 |
| 3,688,295 | 8/1972 | Tsoras et al. | 73/340 X |
| 4,130,019 | 12/1978 | Nitschke | 73/341 |

FOREIGN PATENT DOCUMENTS 2164042  7/1973  France ....................................... 73/340

Primary Examiner—Gerald Goldberg
Assistant Examiner—Joseph W. Roskos
Attorney, Agent, or Firm—Jackson, Jones & Price

[57] ABSTRACT

An apparatus for monitoring or controlling the temperature profile of a kiln or furnace is provided by utilizing a thermocouple array that generates an emf that is indicative of the temperature differential between a monitoring point or points and a chosen reference point in the furnace. The thermocouple array is structured so that an absolute temperature indication is provided at the chosen reference point and the other monitoring points are shown to be either higher or lower than the reference. The thermocouple array may be made in a wire and bead arrangement, or by thick film printing techniques. The EMF output of the array is multiplexed and applied to a CRT-type display wherein the degree of difference (either positive or negative) between each monitoring point and a reference is readily observed and can be easily compensated.

9 Claims, 11 Drawing Figures

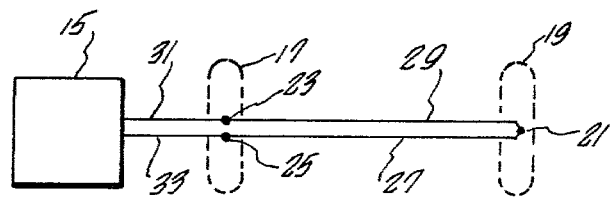
FIG_1.
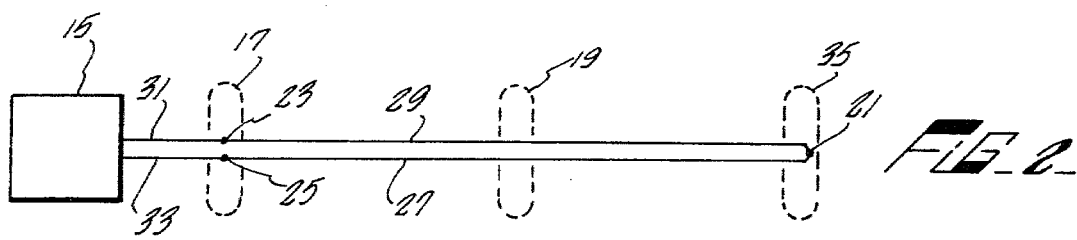
FIG_2.
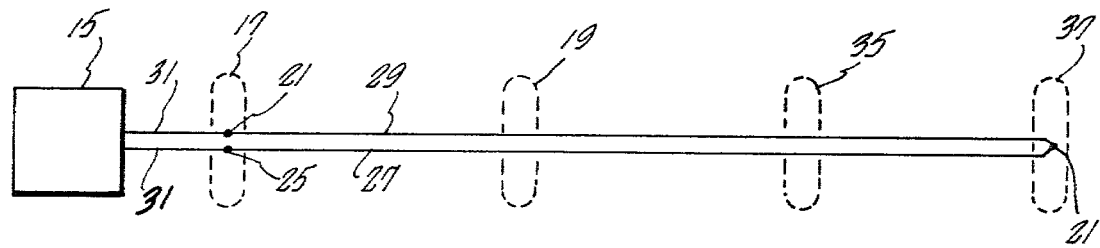
FIG_3.
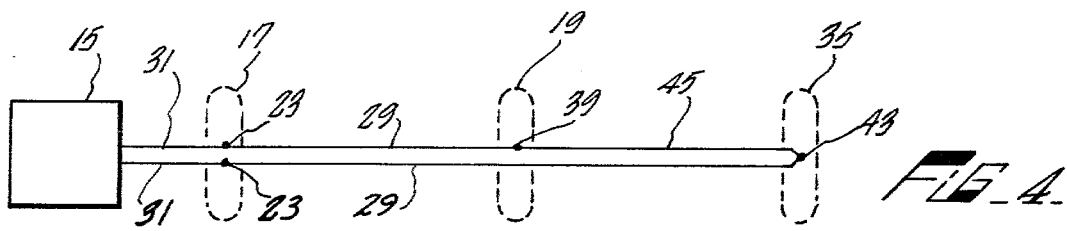
FIG_4.
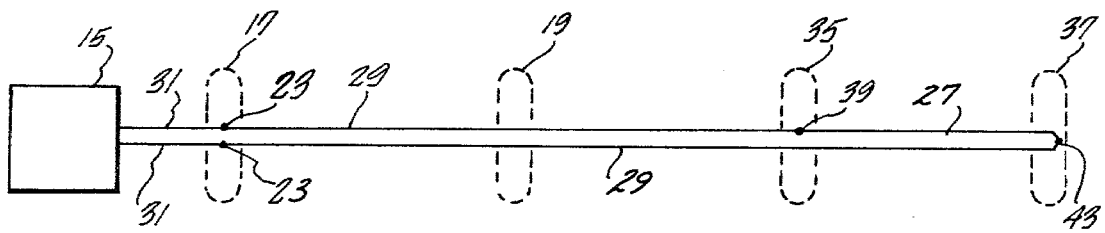
FIG_5.

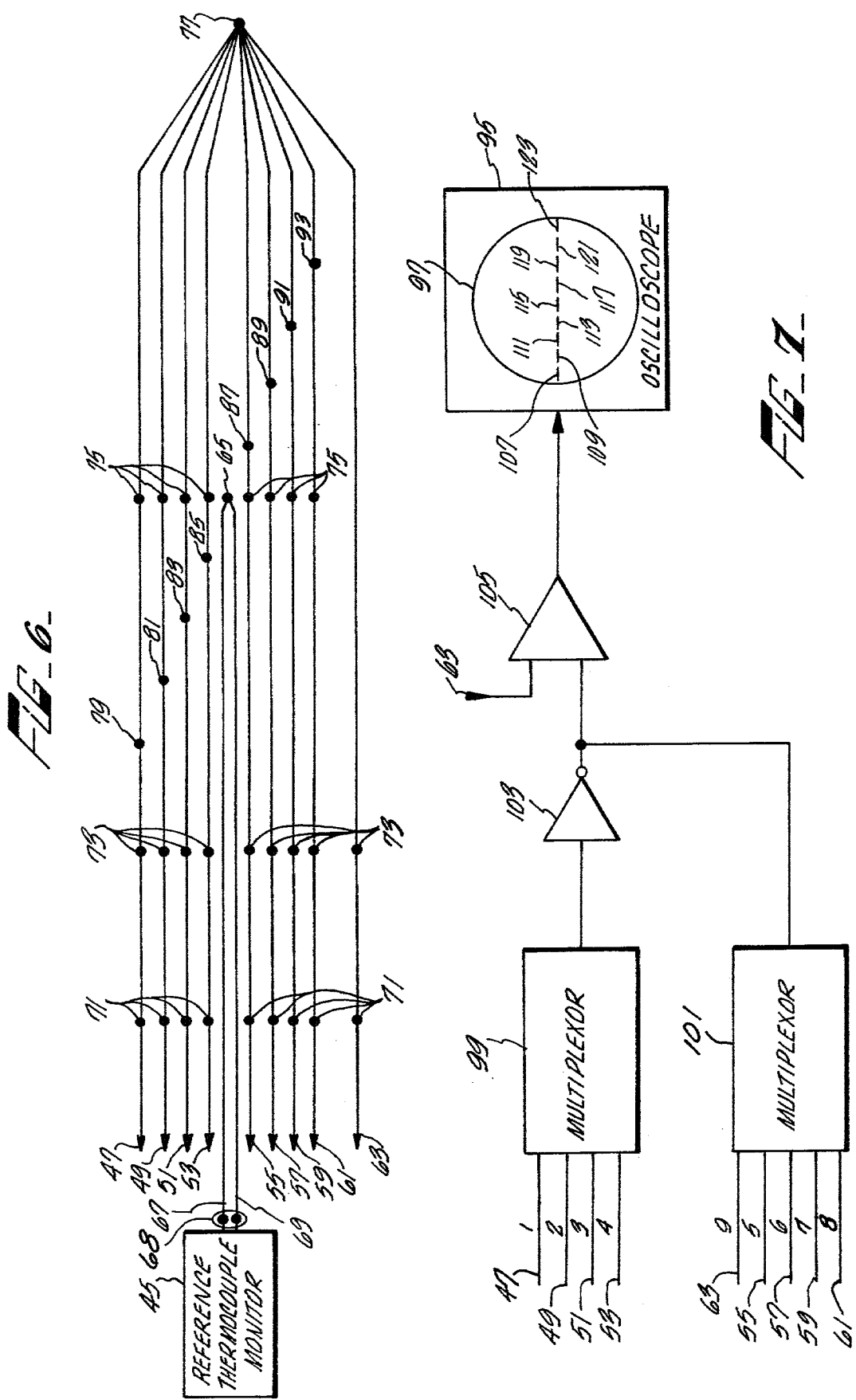

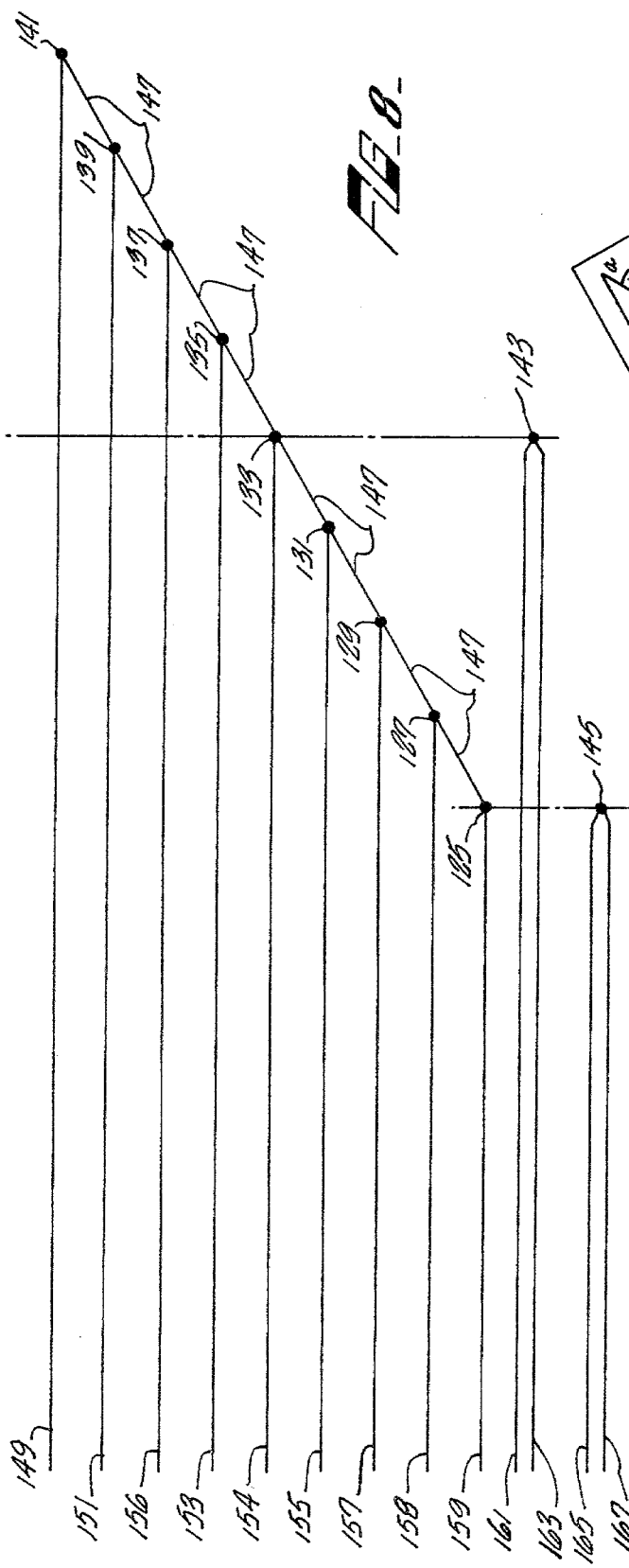
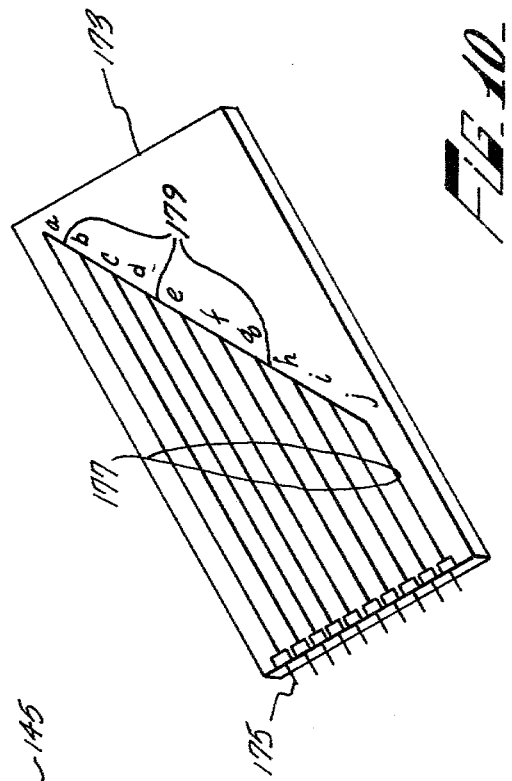
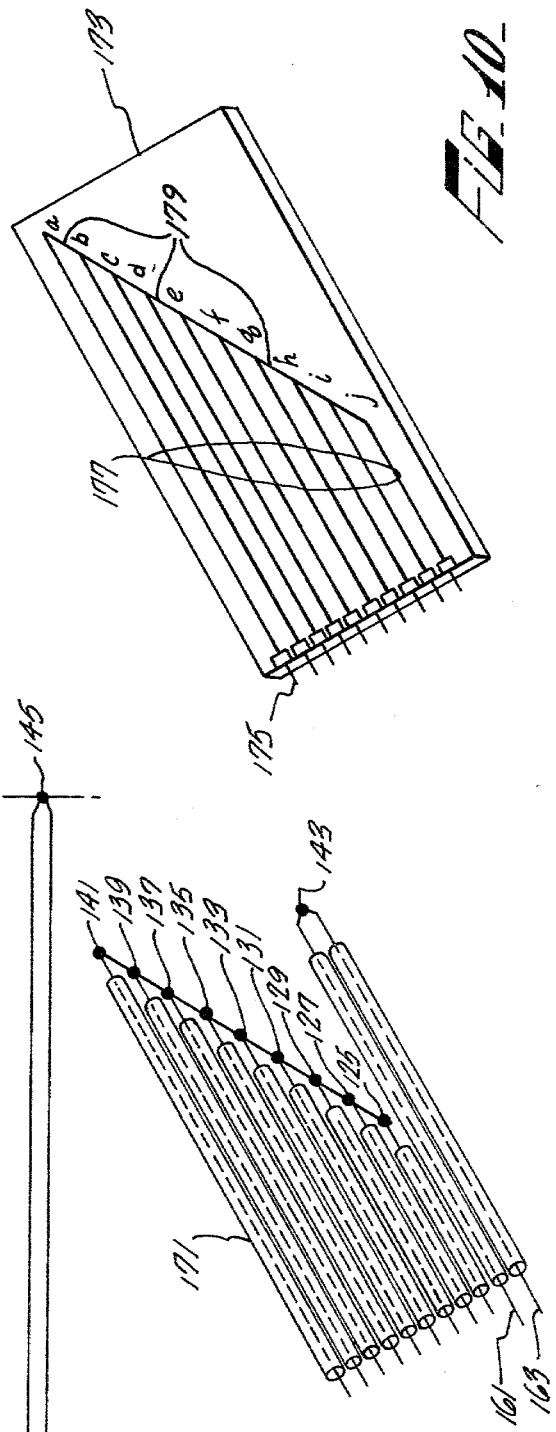

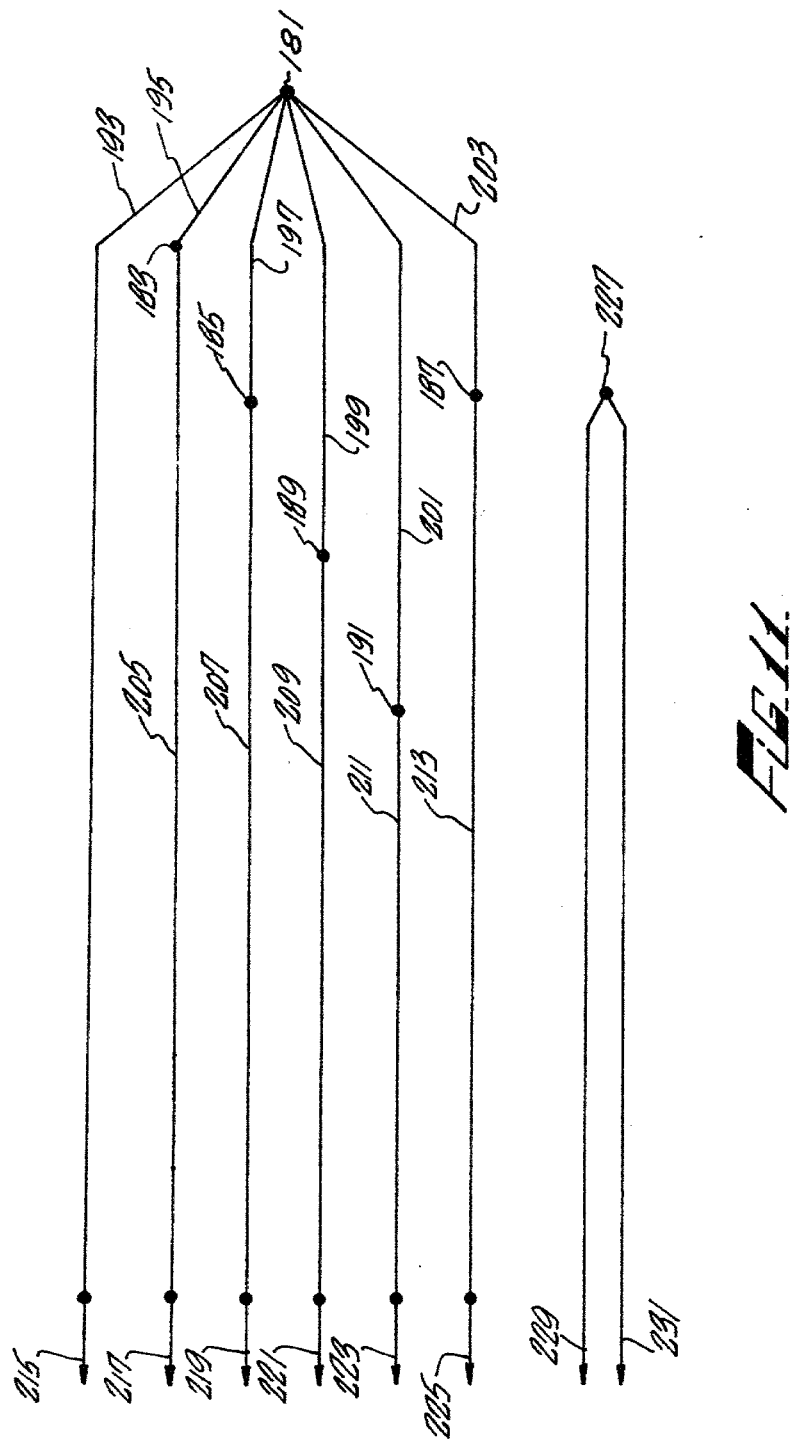

APPARATUS FOR MONITORING AND CONTROLLING A FLAT ZONE IN A FURNACE

BACKGROUND OF THE INVENTION

1. Field of the Invention

The present invention relates to temperature monitoring devices for monitoring the temperature distribution of a furnace or kiln.

2. Description of the Prior Art

Furnaces used in the semiconductor industry are operated to generate a nearly flat profile at around 1200° C. or higher for lengths on the order of three feet or less. The furnaces used are usually of the tube type, having an overall length on the order of six feet. These furnaces are circular in cross-section and vary from two inches to eight inches in diameter. It is generally assumed that the temperature along any given diameter of the tube is the same as that at any other point along the same diameter. The temperature control for this type of furnace is designed to regulate the temperature along the axis of the tube. A flat profile for the furnace, therefore, means that the temperature at one point along the axis of the tube is the same as the temperature at all other points along the axis for points within the flat zone of the furnace.

The flat zone of the furnace is maintained by regulating the power to each of three heating zones within the furnace. The temperature is measured at one point (usually in the center) of each heating zone by a thermocouple, and the feedback from this thermocouple regulates the power to the zone. The heating zones may typically be ten inches to 20 inches long, and the control thermocouples reside outside of the combustion tube whose axis is coincident with that of the furnace.

Profile monitoring in such furnaces is accomplished generally by installing three accurately calibrated thermocouples at various positions along the axis and inside the combustion tube. When all three of these thermocouples register the same temperature, the profile is assumed to be flat. The degree of flatness is determined by the amounts the thermocouple outputs vary. Usually a flat profile requires that the temperature at any point along the axis does not vary by more than $\pm\frac{1}{2}°$ C. At times, larger variations can be tolerated, but present furnace designs attempt to meet a $\pm\frac{1}{2}°$ C. requirement.

There are several disadvantages in this type of profiling technique. Only three points within a relatively long flat zone area are measured at any given time as an indication of the temperature within that zone. The cost of thermocouples capable of accurately determining temperatures in the 1200° C. range and surviving an oxidizing environment is relatively high, and even thermocouples constructed of the most suitable materials need to be recalibrated periodically because of drift in EMF output with time at this temperature.

Attempts have been made to improve on the above-described system by moving the three thermocouples within the flat zone. This is a time-consuming process because the specific heat of the thermocouples requires that the thermocouple be allowed time to reach equilibrium at each given point it is moved to. It has been suggested that more than three thermocouples be used to measure the temperature profile. This is a high cost alternative which is tied directly to the cost of the thermocouple materials. The present invention discloses a thermocouple probe that has improved degradation resistance and has none of the shortcomings of prior art temperature profile measuring techniques.

OBJECTS AND SUMMARY OF THE INVENTION

An object of this invention is to provide a method and means for monitoring and controlling the temperature profile of a kiln or furnace that will not require recalibration of the monitoring thermocouples.

Another object of this invention is to provide a method and means for monitoring and controlling the temperature profile of a kiln or furnace that can utilize inexpensive thermocouple material.

A further object of this invention is to provide a method and means for monitoring and controlling the temperature profile of a kiln or furnace that provides an extremely accurate and high resolution temperature profile.

These objects and the general purpose of this invention are accomplished as follows. Rather than measuring absolute temperatures within the furnace or kiln being monitored, a thermocouple array is used that measures the temperature differential between a monitoring point or points and a reference point in the furnace or kiln. The reference point of the thermocouple array is read out in absolute temperature. The thermocouple array can be constructed as a circular probe using wire and bead construction or a flat probe by the use of the thick film thermocouple inks. The output EMF from the probe leads is multiplexed onto a CRT-type display device to provide a series of dashed lines (one for each monitoring point) that represent the variation in degree, for that particular point in the kiln, from a reference point centrally located on the screen. The absolute temperature of the reference point is read from another instrument.

BRIEF DESCRIPTION OF THE DRAWINGS

The exact nature of this invention, as well as other objects and advantages thereof, will be readily apparent from consideration of the following specification related to the annexed drawings, in which like reference numerals designate like parts throughout the figures thereof, and wherein:

FIG. 1 is an example of a standard thermocouple circuit;

FIG. 2 is an example of another standard thermocouple circuit;

FIG. 3 is an example of a third standard thermocouple circuit;

FIG. 4 is an example of a temperature differential thermocouple circuit;

FIG. 5 is an example of another temperature differential thermocouple circuit;

FIG. 6 is a schematic illustration of a thermocouple probe built according to the present invention;

FIG. 7 is a block diagram of a display circuitry which may be used with the thermocouple probe of FIG. 6;

FIG. 8 is a schematic illustration of a thermocouple probe built according to the present invention;

FIG. 9 is a schematic illustration of a thermocouple probe built according to the present invention;

FIG. 10 is a schematic illustration of a thermocouple probe built according to the present invention;

FIG. 11 is a schematic illustration of an alternative embodiment of a thermocouple probe built according to the present invention.

DESCRIPTION OF THE PREFERRED EMBODIMENTS

Flatness in a temperature zone is determined by the differences between temperatures at various points along a line. Referring now to FIGS. 1 through 4, it can be seen that there are two possible ways of determining the difference between temperatures at temperature points 17, 19, 35 and 37. The wires 29 and 27 are two dissimilar metals joined at point 21 (FIG. 1) to form a temperature measuring junction. These wires are joined at 25 and 23, respectively, to a pair of wires 31—31, which are similar wires, these wires being attached to an EMF measuring circuit 15. The electromotive force (EMF), E, generated by the thermocouple circuit made up of wires 27, 29 and junction 21, corresponds to the difference between the temperatures at point 19 and point 17. The temperature at point 17 is normally considered the temperature of the cold junction, or reference junction, and the temperature of point 19 is that of the hot, or measuring, junction. This can be expressed algebraically as follows:

$$E_1 = K_{AB} \times (T_2 - T_1)$$

where:
$K_{AB}$ is the thermoelectric power for the metals A and B.
$T_2$ is the temperature at the measuring junction.
$T_1$ is the temperature at the reference junction.

The equation for the temperature measuring circuit of FIG. 2 can be likewise expressed as:

$$E_2 = K_{AB} \times (T_3 - T_1)$$

where:
$T_3$ is the temperature at measuring junction 35.
$T_1$ is the temperature at reference junction 17.

The equation of the temperature measuring circuit of FIG. 3 can be expressed as:

$$E_3 = K_{AB} \times (T_4 - T_1)$$

where:
$T_4$ is the temperature at measuring junction 37;
$T_1$ is the temperature at reference junction 17.

The flatness of a particular zone, that is, the area between the points 19 and 37, $\Delta T$ can be described by the difference between temperatures at different points in the zone. This can be expressed as follows:

$$\Delta T \times \pm (T_2 - T_3) \text{ or } \pm (T_3 - T_4) \text{ or } \pm (T_2 - T_4)$$

In standard practice, the largest $\Delta T$ observed within the zone is used to describe the degree of zone flatness. According to equations 1 and 2, therefore:

$$E_1 - E_2 = K_{AB}(T_2 - T_3) = K_{AB} \Delta T$$

That is, the difference in the absolute temperature between points 35 and 19 is proportional to the degree of flatness of the zone between temperature point 35 and temperature point 19.

Because the present invention is concerned with how flat a flat profile is, and not the measuring of absolute temperatures at various points in a temperature zone, the difference $\Delta T$ is of primary concern. Consider now FIGS. 4 and 5, where it can be seen that the equation for the EMF circuit including junctions 39 and 43 is:

$$E_4 = K_{AB}(T_3 - T_2) = K_{AB} \Delta T$$

For FIG. 5:

$$E_5 = K_{AB}(T_4 - T_3) = K_{AB} \Delta T$$

These two equations tell us that the measured EMF output of the thermocouple junction combination 39 and 43 tells us nothing about the absolute temperatures of $T_2$, $T_3$ or $T_4$, but it very accurately tells us what the difference in the temperatures is between junction 43 and junction 39.

The improved accuracy of a temperature differential occurs as a result of the independence of the EMF output of circuit 39, 43 on the temperature at the reference junction temperature point 17. Another important consequence of determining the temperature differential in this fashion lies in the fact that when the temperature differential $\Delta T$ is zero, the temperature at points 35 and 19, or 37 and 35, are at the same value; and, now, the flatness determination is also independent of the thermoelectric power constant $K_{AB}$. This means that no matter how much the thermocouple changes in composition as a result of metal migration, or for any other reason drifts, the most accurate determination of $\Delta T$ is achieved when $\Delta T$ is zero.

Thermocouple drift results essentially from junction deterioration causing the effect of drift of the EMF output of the thermocouple junction. If drift occurs in the junction shown in FIGS. 4 and 5, it only becomes serious if a complete sign reversal of $K_{AB}$ occurs; and this is very unlikely. Normally, $K_{AB}$ changes only slightly with time and temperature, causing drift. This drift would generate an error in the absolute magnitude of the $\Delta T$, which generally is not critical. However, it should be remembered that because junction 43 and 39, for example, are in very similar, if not identical temperature zones 19 and 35, any drift that would occur because of a change in $K_{AB}$ could be predicted to occur in the same direction for both junctions.

Another major cause of EMF drift occurs as a result of inhomogeneities induced within thermocouple wires due to their presence in a high temperature gradient. A high temperature gradient does exist in the area between point 17, (the near room temperature reference point) and point 19 (the first high temperature point of the monitored zone). In FIGS. 1, 2 and 3 two dissimilar wires 29 and 27 traverse this high temperature gradient region and the compositional changes occurring are not necessarily the same in each wire. The EMF can drift with time in this case. In FIGS. 4 and 5, wires of the same material traverse the high temperature gradient region and compositional changes induced within these wires are very nearly the same resulting in effectively no EMF drift with time.

Based on the foregoing, a thermocouple probe could be built as illustrated in FIG. 6 for determining the degree of flatness of a given furnace profile with extreme accuracy and resolution. The probe of FIG. 6 could be manufactured from a range of dissimilar metals. Junctions 93, 91, 89 and 87 could be made of Engelhard 5355 alloy and Engelhard 7674 alloy. Junctions 75 could be made of Engelhard 7674 alloy and Engelhard 5355 alloy. Junctions 85, 83, 81 and 79 could be made of Engelhard 7674 alloy and Engelhard 5355 alloy, going from right to left. Junction 65, which is a reference thermocouple, is preferably made of platinum plus 6% rhodium and platinum plus 30% rhodium. Junctions 73 would preferably be Engelhard 5355 alloy and Hoskins Alumel. Junctions 71 could be Hoskins Alumel and copper wire. Copper wire leads 47, 49, 51, 53, 55, 57, 59, 61 and 63 could be used to lead to the temperature measuring equipment of FIG. 7. Leads 67 and 69 connect the platinum-rhodium thermocouple junctions 65 to a thermocouple monitoring thermometer 45 which is well known in the art and will not be described herein.

It should be remembered that the above wire configuration of the probe is only one example of a preferred embodiment which demonstrates the range of possibilities of the dissimilar metals that could be utilized. For example, thermocouple junction 71 could be eliminated and junction 73 could be made of junction 71 constituency. In addition, the profile measuring junctions 79–93, as well as the reference junction 75, could be made of other thermocouple material than as indicated, as long as they exhibited the thermocouple effect.

FIG. 6 does not illustrate, but it should be assumed, that each of the individual wires that are coming from the probe 47, 49, 51, 53, 67, 69, 55, 57, 59, 61 and 63, are separated by appropriate insulating materials, such as glass, alumina, silica, etc. The junctions, however, may not be covered. Then again, because they are buttwelded junctions, they can be.

Because thermocouple junction 65 is the master reference couple, calibration of this thermocouple is important. Its output is proportional to the temperature at the center of the profile junction array, and provides the only means of determining the absolute temperature or position of the profile on the temperature scale illustrated on the display device. The reference junction 68 for the master reference couple is in its normal position, and the reference thermocouple 65 behaves as any standard thermocouple would. This thermocouple 65 can be electrically independent of all the other thermocouples, and can be monitored independently by monitor 45. It is critical that the thermocouple junction 65 be monitoring the temperature of the reference junctions 75 for all the other thermocouples, 79, 81, 83, 85, 87, 89, 91 and 93. The monitoring reference couple 65 need not be an integral part of the thermocouple probe of FIG. 6, as long as its temperature tracks that of the reference junction 75 of the probe. However, it can be readily seen that if it is an integral part of the probe of FIG. 6 (and the couple 65 is in close proximity to the reference junction 75 of the probe), it is virtually assured that the master reference couple will track the temperature of the monitoring junctions.

Referring now to FIG. 7, the outputs of the thermocouple wires 47, 49, 51, 53, 55, 57, 59, 61 and 63 corresponding to the temperature measuring junction 79, 81, 83, 85, 87, 91, 93 and 77 are provided to multiplexers 99 and 101. The multiplexers sequentially sample the potential on each of the wires 1–9, and supply them to an instrumentation amplifier 105. The output of the amplifier is impressed on the Y-axis of oscilloscope 95, which has its X-axis sweep wave synchronized with the time required to sense all of the thermocouples, plus a fictitional thermocouple in the center to represent the reference thermocouple.

Because of the geometry of thermocouple probe of FIG. 6, a polarity reversal occurs when crossing the reference junction 65 going from left to right. Thus, thermocouples 79, 81, 83 and 85 provide an EMF value of one sign with increasing temperature, while thermocouples 87, 89, 91 and 93 provide an EMF value of the opposite sign with increasing temperature. This is compensated for by placing an inverting amplifier 103 at the output of multiplexer 99 which receives the EMF outputs of thermocouple junctions 79, 81, 83 and 85. It should be remembered that the reference junctions thermocouple 75 could be placed anywhere within the flat zone of the monitoring thermocouples, and they could be placed, therefore, at a point parallel to temperature junction 79. With such placement, no sign reversals will occur.

When the temperature probe of FIG. 6 is placed in a perfectly flat temperature zone so that all the junctions are at the same temperature, the CRT screen 97 will display a straight horizontal line consisting of nine equally spaced segments, 107, 109, 111, 113, 115, 117, 119, 121 and 123. There will be four segments on each side of a center segment 115. The center segment 115 may be somewhat brighter than the others. It would represent the position of the absolute temperature of the zone as read on the reference thermocouple monitor 45 which senses the output of reference thermocouple 65. The actual voltage input to the Y-axis of the oscilloscope 95 during the time the center segment is being displayed is zero at all times because during this time there is never a signal at the input to instrumentation amplifier 105. This is because line 63, which is the common lead for the thermocouples 79–93, is sampled at the time period for a segment 115. Instrumentation amplifier 105 receives a signal from the common lead line 63, each time it receives a signal from the individual temperature thermocouple leads.

The center segment thus can represent the position of the absolute temperature of the zone as read on the reference thermocouple monitor 45. The reference thermocouple thermometer output as read on its monitor serves to index the calibrated graticule on the screen 97 of the oscilloscope 95 which can be used to indicate the extent of deviation from flatness of the other eight points and the number of degrees per deviation.

Calibration of the graticule can be simply accomplished either by knowledge of the value of the thermoelectric power at the zone temperature, or by empirical calibration employing a gradient furnace. It should be obvious to those skilled in the art that the thermoelectric power $K_{AB}$ is proportional to the gain of the amplifier in this circuit, and for this reason, very accurate graticule calibration can be achieved.

The temperature probe used with the display system of FIG. 7 is a very stable temperature measuring device because it experiences very little in drift. Thermocouple drift is generally caused by the fact that one junction in a standard thermocouple circuit resides at a relatively low temperature where little metallurgical change can occur while the hot junction is subject to considerable metallurgical change, depending on the materials and temperatures involved. In the probe of FIG. 6, with both junctions at nearly the same temperature (junction 75 and junctions 79–93), any changes in junction composition are expected to be similar for the reference junction 75 and the temperature measuring junctions 79–93. The slope of the EMF versus temperature curve or the value of thermoelectric power $K_{AB}$ for these materials will therefore not be expected to change with time.

This plays a very important role in substantiating the claim of this invention that an accurate measuring technique, is provided which requires a minimum of calibration. In use of the probe of FIG. 6, the reference thermocouple 65 is really the only one which may need to be recalibrated.

Referring now to FIGS. 8, 9 and 10, an alternate preferred embodiment of the probe of FIG. 6 is illustrated in which the probe assumes a flat configuration rather than a round configuration. FIG. 8 illustrates a flat thermocouple assembly wherein thermocouple wires are utilized. Wires 149, 151, 156, 153, 154, 155, 157, 158 and 159 could be Engelhard 5355 alloy, for example. Whereas wire 147, extending from junction 141 to 125, could be Engelhard 7674 alloy, for example. Thermocouple 143 is located midway between thermocouple junctions 141, 139, 137 135, 133, 131, 129, 127 and 125. Separate thermocouple 145 is located at thermocouple junction 125. Thus, FIG. 8 illustrates the use of a reference thermocouple at one end of the temperature measuring array, such as reference thermocouple 145, or in the middle of the array, such as temperature reference thermocouple 143. To measure the temperature differential between point 141 and point 133, lead 154 and lead 149 are connected to the display amplifier 105. It should be remembered that when the lead 154 is utilized as a common return, the reference junction is 133 and thermocouple 143 is utilized to measure the temperature at the reference junction. To measure the temperature differential between junction 139 and reference 133, leads 154 and 151 are used. For junction 129, leads 154 and 157 are used. For junction 135, leads 154 and 153 are used. For junction 131, leads 154 and 155 are used. For junction 129, leads 154 and 157 are used. For junction 127, leads 154 and 158 are used. For junction 125, leads 154 and 159 are used.

If junction 125 were to be used as the reference junction, then temperature measuring thermocouple 145 would be utilized and the connections to the probe of FIG. 8 would be as follows. The temperature at junction 125 is measured by lines 165 and 167. Junction 127 would be leads 159 and 158. Junction 129 is leads 159 and 157. Junction 131 is leads 159 and 155. Junction 133 is leads 159 and 154. Junction 135 is leads 159 and 153. Junction 137 is leads 159 and 151. Junction 156 is leads 159 and 151. Junction 141 is leads 159 and 149.

FIG. 9 illustrates how the temperature probe of FIG. 8 would be insulated by means of a plurality of cylindrical beads 171 slipped on the wires exposing the temperature measuring thermocouples 141–125, etc.

FIG. 10 is an alternate preferred embodiment of the flat thermocouple structure exemplified by FIG. 8. It is implemented by thin film deposition techniques, or thick film inks which are silk screened onto the insulating substrate 173. The lines 177 could be Engelhard 3252 material, and the line 179 could be Engelhard 3253 materials for example. The leads 175 of the flat thermocouple are utilized just as the leads in the construction of FIG. 8 are utilized. A reference thermocouple is not shown. However, it can be likewise photo-deposited on the substrate 173, or silk screened if thick film inks are utilized.

Referring now to FIG. 11, an alternate preferred embodiment of a thermocouple probe similar to the construction of the probe shown in FIG. 6 is illustrated. The difference between the probe of FIG. 11 and that of FIG. 6 is that no temperature reversal occurs in this probe because the reference junction 187 is located on the common line 203. Subsequent to the common junction point 181, lines 203, 201, 199, 197 and 195, are preferably made up of Engelhard 7674 alloy. The other side of the junction, lines 193, 205, 207, 209, 211 and 213 are preferably made up of Engelhard 5355 alloy.

The temperature measuring junctions are therefore junctions 181, 183, 185, 189 and 191. Thermocouple junction 187 is the reference junction for the above five couples. No polarity reversal occurs in this probe. Thermocouple 227 via leads 229 and 231 measures the reference temperature of the reference junction 187. The other junctions, 181, 183, 185, 189 and 191, measure the differential between the temperature at these junctions and the temperature at reference junction 187.

Thus, by connecting a display device to line 215 and common line 225, provides an indication of the temperature difference between junctions 181 and 187. Line 217 provides the differential between junctions 183 and 187. Line 219 provides the differential between junctions 185 and 187. Line 221 provides the differential between junctions 189 and 187. Line 223 provides the differential between junctions 191 and 187.

What has been described, therefore, is thermocouple temperature profiling probes that provide a temperature differential between various monitoring points and a reference point in a furnace or kiln, which probe does not require recalibration of its various thermocouple junctions, except for one independent reference junction. It should be understood, of course, that the foregoing disclosure relates only to preferred embodiments of the invention, and that modifications may be made therein without departing from the spirit and scope of the invention as set forth in the appended claims.

What is claimed is:

1. A thermocouple probe for monitoring the flat zone profile of a furnace by generating signals indicative of the temperature differential between a plurality of points along the length of the probe, said probe comprising:

a plurality of temperature measuring thermocouple junctions laterally displaced along the length of the probe;

a plurality of reference thermocouple junctions, one for each temperature measuring junction, displaced from and electrically connected to its respective temperature junction, each reference junction being located in a single plane displaced along the length of the measuring portion of the probe; and a single common return lead electrically connected to each of the reference junctions and temperature junctions.

2. The thermocouple probe of claim 1 further comprising:

an independent thermocouple located in the single common temperature plane of said reference junctions, whereby said independent thermocouple provides an absolute temperature reading of the temperature at said common temperature plane and each of said plurality of temperature junctions provide a temperature reading that represents the difference in temperature between it and its reference junction.

3. The thermocouple probe of claim 1, wherein each thermocouple junction is formed by the connection of a first and second type of thermocouple wire at their respective first ends and each reference junction is formed by connecting a first end of a first type of thermocouple wire to the second end of the second type of thermocouple wire, and each of the second ends of the first type of thermocouple wire is connected at a common junction point to a common return wire of the first type of thermocouple wire, said second type of thermocouple wire being considerably shorter in length than said first type of thermocouple wire.

4. A thermocouple probe for monitoring the flat zone profile of a furnace by generating signals indicative of the temperature differential between a plurality of points along the length of the probe, said probe comprising:
- a single thermocouple wire of a first type running approximately the length of the probe; and
- a plurality of thermocouple wires of a second type, equal in number to the thermocouple junctions of the probe, each of the thermocouple wires of the second type being electrically connected to the single wire of the first type, along its length to form a plurality of junctions.

5. The thermocouple probe of claim 4 further comprising an independent thermocouple located at the location of one of said thermocouple junctions designated as the reference junction.

6. The temperature probe of claim 4 wherein the first and second type of thermocouple wires and the junctions are formed by thick film inks on an insulating substrate.

7. The temperature probe of claim 4 wherein the first and second type of thermocouple wires and their junctions are formed by thin film deposition on an insulating substrate.

8. A thermocouple probe for monitoring the flat zone profile of a furnace by generating signals indicative of the temperature differential between a plurality of points along the length of the probe and a reference point, said probe comprising:
- a plurality of thermocouple junctions along the length of said probe formed by the electrical connection of a first type of thermocouple wire to a second type of thermocouple wire;
- a reference junction in the temperature measuring portion of the probe formed by the electrical connection of a first type of thermocouple wire to a second type of thermocouple wire, all the first type of thermocouple wires from the thermocouple junction and the reference junction being electrically connected together at a common point; and
- a second type of thermocouple wire electrically connected to the common connecting point.

9. The thermocouple probe of claim 8 further comprising an independent thermocouple located at the reference thermocouple junction.

* * * * *